United States Patent [19]
Koerper

[11] Patent Number: 5,099,606
[45] Date of Patent: Mar. 31, 1992

[54] PLANT-CULTIVATION BOARD

[75] Inventor: Hans Koerper, Geretsried, Fed. Rep. of Germany

[73] Assignee: Vivaria GmbH, Geretsried, Fed. Rep. of Germany

[21] Appl. No.: 454,769

[22] Filed: Dec. 21, 1989

[30] Foreign Application Priority Data

Dec. 21, 1988 [DE] Fed. Rep. of Germany ... 8815857[U]

[51] Int. Cl.$^5$ ............................................. A01G 9/02
[52] U.S. Cl. ........................................... 47/66; 47/67; 47/70
[58] Field of Search ................................ 47/66, 67, 70

[56] References Cited

U.S. PATENT DOCUMENTS

| D. 238,132 | 12/1975 | Stevens | 47/67 X |
|---|---|---|---|
| 877,145 | 1/1908 | Waddell | 47/41.13 |
| 2,072,395 | 3/1937 | Dodson | 47/66 |
| 4,020,793 | 1/1978 | Dillon | 47/67 |
| 4,268,994 | 5/1981 | Urai | 47/67 X |
| 4,295,295 | 10/1981 | Kinghorn | |
| 4,295,296 | 10/1981 | Kinghorn | |
| 4,920,695 | 5/1990 | Garden | 47/67 X |

FOREIGN PATENT DOCUMENTS

| 080252 | 6/1983 | European Pat. Off. |
|---|---|---|
| 8505654 | 8/1985 | Fed. Rep. of Germany |
| 3415911 | 10/1985 | Fed. Rep. of Germany |
| 2255842 | 7/1975 | France |
| 2511067 | 2/1983 | France |

Primary Examiner—David A. Scherbel
Assistant Examiner—Linda J. Watson
Attorney, Agent, or Firm—Christie, Parker & Hale

[57] ABSTRACT

Known plant-cultivation boards for vertical epiphyte planting in a plant substrate are nowadays made of wickerwork of tree fern roots cut into a cuboid shape. However, this material should no longer be used for reasons of protection of the species. Moreover, when the epiphytes are replanted, the roots cannot, or only with a high degree of destruction be detached from the known plant-cultivation boards. For eliminating this disadvantage and permitting also a use of other plant substrates, it is suggested that a receptacle (1) should be created for the plant substrate, which comprises a back wall (3) provided with a smooth inner surface facing the plant substrate and a front wall (2) which is composed of a plurality of releasable elements (13) provided with fastening means for fastening the plants and which includes at least one opening (21) permitting the plants to reach the plant substrate, the opening being formed by spacers (18) arranged between the elements (13).

22 Claims, 2 Drawing Sheets

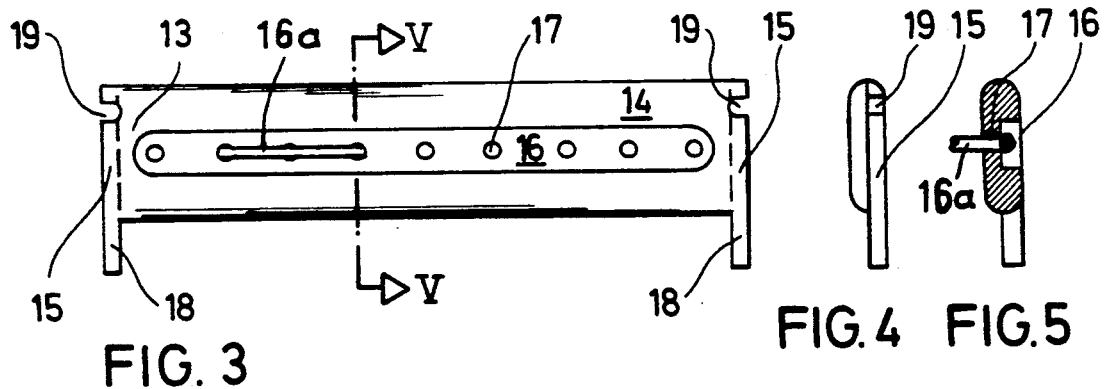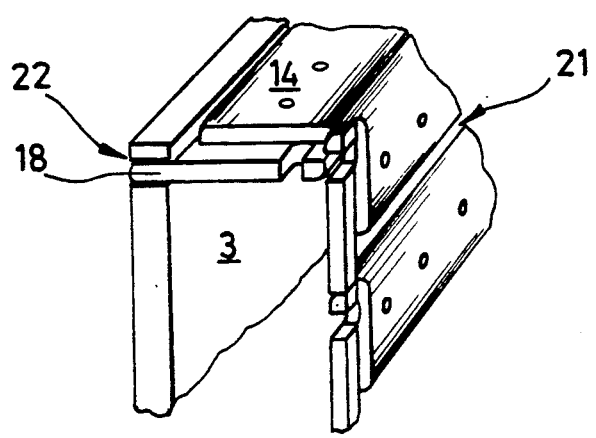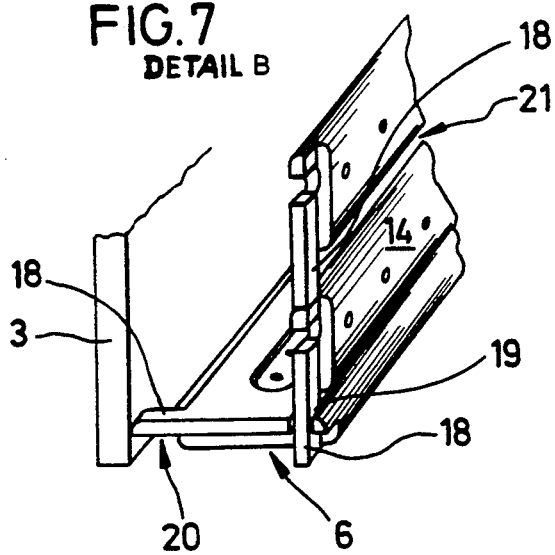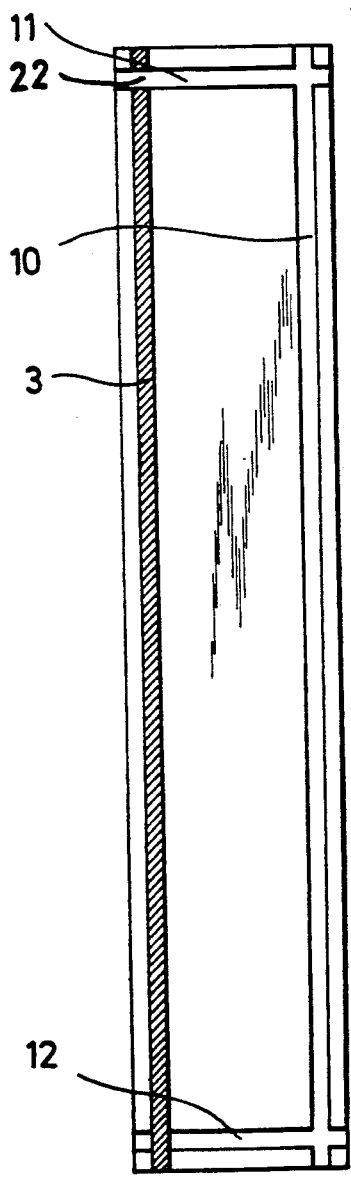

PLANT-CULTIVATION BOARD

FIELD OF THE INVENTION

The present invention relates to a plant-cultivation board.

For special forms of growth, in cases in which there is not enough space, or in the case of presentation above eye level, it will be more expedient to refrain from planting epiphytes, in particular epiphytic orchids, in the epiphyte baskets, which are known e.g. from DE-U-85 05 654 and into which the epiphytes have to be placed from above, but the epiphytes should be bound onto an appropriate vertical support which is then suspended. Up to now, epiphytes have been bound onto plant-cultivation boards consisting of tree fern roots for this purpose. These plant-cultivation boards consisted of wickerwork of tree fern roots, which was cut into a cuboid shape and which—without having any separate envelope—was directly provided with a suspension hook. However, in order to protect the existing tree ferns, this wickerwork of tree fern roots should no longer be used as a plant substrate. Other plant substrates, such as flakes or bristles of plastic material, are, however, not suited to be used as a plant-cultivation board. An additional serious disadvantage of the known plant-cultivation boards consisting of wickerwork of tree fern roots is to be seen in the fact that it is hardly possible to removed therefrom—e.g., in cases in which the plants have to be divided or replanted into a fresh substrate—a plant whose roots cling to such a cultivation board without damage being caused to the plant. Taking into account the high prices which have to be paid especially for rare orchids, these orchids have not been planted in plant-cultivation boards up to now, although this type of arrangement would correspond to their natural growth characteristics.

Hence, the present invention is based on the task of providing a plant-cultivation board, which can be used with all commercially available loose plant substrates and which permits planting and replanting without causing damage to the roots.

SUMMARY OF THE INVENTION

In an embodiment according to the present invention, a comparatively loose plant substrate, such as flakes of plastic material, sphagnum or the like, can be used for vertical planting. In view of the fact that, in the case of the plant-cultivation board according to the present invention, the plants are exclusively secured to releasable elements, it is possible to use an extremely loose, if desired highly porous plant substrate or a plant substrate with a high capillary effect, said plant substrates guaranteeing optimum aeration as well as a necessary humidity of the air and a sufficient supply of water to the plants. It follows that the plant substrate of the plant-cultivation board according to the invention need not even fulfil the fastening function which keeps the plant upright in the case of planting in epiphyte baskets. Planting can be carried out, in a manner which will not cause any damage to the roots, by combining the releasable elements one after the other so as to form the front wall; whenever a new element has been inserted, the roots will be drawn through the openings, spread on the substrate and covered by new substrate prior to fastening the next releasable element. Due to the smooth surface abutting on the interior of the receptacle, the roots will not be able to cling to the back wall located opposite the openings so that, when the releasable elements of the front wall are disassembled, each of the plants secured to one of the elements can be removed from the plant-cultivation board. It is also possible to pour the substrate out of the receptacle and to replace it by fresh substrate.

A plant-cultivation vessel with walls consisting of releasable elements is already known from FR-A-2 255 842. This known plant-cultivation vessel is, however, used for a vertical culture of vegetables, strawberry plants or the like. In the case of one embodiment, the plant-cultivation vessel consists of a frame into which rectangular slide-in plates are inserted. Opposed edges of said slide-in plates are provided with semicircular, aligned recesses forming circular holes for the plants when the slide-in plates meet. The plants are inserted through the circular holes only after the receptacle has been assembled and filled with soil, and their roots are pressed into the soil with the aid of a planting pin. It follows that a transfer of this construction to plant-cultivation boards for epiphytes would not provide any advantage in comparison with the known plant-cultivation boards consisting of wickerwork of tree fern roots, since also in the case of the known plant-cultivation vessel the roots must cling to the substrate and to the inner side of the receptacle so that the plants are prevented from falling out of the openings in the case of a vertical culture.

A particularly simple structural design of the plant-cultivation board according to the present invention is obtained by the use of slide-in plates as releasable elements, for the front wall, for a base or for an upper cover wall; said upper cover wall can also be omitted if a more intensive humidification is desired.

When, slide-in plates having identical structural designs are used for the front wall, the base and, if desired, for the upper cover wall, the assembly of the plant-cultivation board is facilitated still further, since it is not necessary to pay any attention to the right order of the slide-in plates.

Preferably measures are provided that guarantee in a simple manner that the plant-cultivation board cannot be disassembled unintentionally.

The largest possible area of the openings provided between the slide-in plates is achieved on the basis of the feature that the spacers are sunk in the guide grooves.

A specially preferred embodiment of the fastening means, guarantees that neither the substrate nor the roots can cling to the binding material.

When the back wall is made of transparent material, the extent to which the roots have spread in the substrate, the condition of the roots as well as the condition of the substrate can be monitored in a simple manner.

In contrast to the back wall surface facing inwards, slide-in plate surfaces facing outwards can be provided, e.g. with channels, with a grained surface, with flutes or the like, which, on the one hand, prevents irritating light reflection making the plant-cultivation board thus less conspicuous and which, on the other hand, gives some support to the roots which can definitely cling to the element surfaces facing outwards, since they are replanted together with the elements.

DESCRIPTION OF THE FIGURES

One embodiment of the present invention will be explained in detail on the basis of the drawings, in which FIG. 2 shows the section II—II of FIG. 1 in a condition in which the front wall, the cover wall and the base have been removed, FIG. 3 shows the rear view of a slide-in plate, FIG. 4 shows the side view of the slide-in plate, FIG. 5 shows the section V—V of FIG. 3, FIG. 6 shows an enlarged detail A of FIG. 1 in a condition in which the side wall has been removed, and FIG. 7 shows an enlarged detail B of FIG. 1 in a condition in which the side wall has been removed.

DETAILED DESCRIPTION

Figure 1:
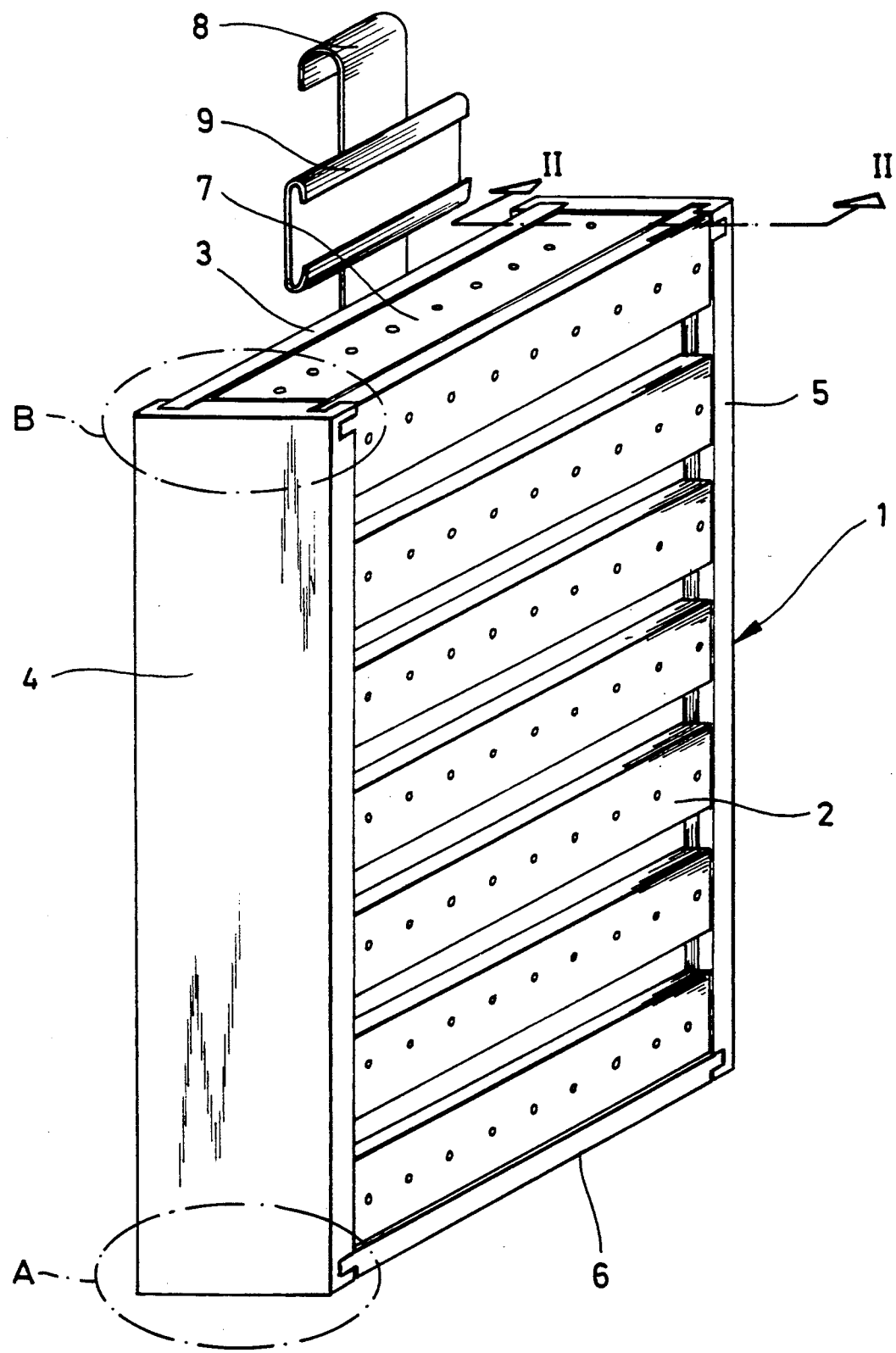
FIG. 1 shows a perspective view of the plant-cultivation board according to the invention.

The disclosure, claims and drawings of West German application serial no. G 88 15 857.8, filed Dec. 21, 1988, is incorporated by reference herein for additional disclosure of the invention.

FIG. 1 discloses a receptacle 1, which, when filled with a plant substrate, forms a plant-cultivation board for vertical planting with epiphytes (not shown). The receptacle 1 has the form of a flat cuboid, which stands on its narrow edge, and it comprises a front wall 2, a back wall 3, two narrow, perpendicular side walls 4 and 5, a base 6 and an upper cover wall 7. All walls are made of plastic material and have a smooth surface which faces the interior of the receptacle 1 and to which the roots of the epiphytes do not cling, this being particularly important with regard to the back wall 3, since said back wall is located essentially in the direction of growth of the roots. The back wall 3 is made of a transparent material, in particular of a transparent plastic material. The back wall 3 has secured thereto a hook 8 in the form of a bent sheet-metal strip used for suspending the receptacle 1. The hook 8 supports an insertion guide means 9 in the form of a sheet-metal strip with bent edges for inserting nameplates therein.

As can be seen from FIG. 2, the side walls 4 and 5 are provided with continuous guide grooves, which are provided in said side walls 4 and 5 with identical dimensions, but in a mirror-inverted mode of arrangement. The perpendicular longitudinal edge facing away from the back wall 3 has provided therein a perpendicular guide groove 10. The upper and the lower ends of the side walls 4, 5 are each provided with a horizontal guide groove 11, 12. All guide grooves 10, 11 and 12 have the same width, the same depth and the same distance from the respective adjacent, parallel edge of the side wall 4 and 5, respectively. It will be expedient when an additional, non-visible guide groove is provided, which is used for receiving therein the back wall and in which said back wall is secured in position by means of an adhesive. It follows that the only components of the receptacle 1 which are fixedly connected to one another are the back wall 3 with the hook 8 and the two perpendicular side walls 4 and 5.

The front wall 2, the base 6 and the upper cover wall 7 are formed by a plurality of idetical slide-in plates 13 constructed as releasable elements, one of said slide-in plates being shown in detail in FIG. 3. The slide-in plate 13 consists of a stripshaped basic member 14, the two narrow sides of which are provided with longitudinally extending slide webs 15. The rear surface of the basic member 14, which will face the plant substrate later on, is provided with a groove 16 communicating with the outside via openings 17. A binding material, e.g. a binding wire 16a, is sunk in said groove 16, the ends of said binding material being passed through the openings 17 so that the plants, which are not shown, can be secured in position on the front side. The groove 16 can extend essentially throughout the whole length of the basic body 14 and receive therein a single row of horizontally arranged openings. Other arrangements, e.g. several grooves interconnecting two respective superimposed holes, are imaginable as well. The edges of the basic body 14 which are not provided with said slide webs 15 are rounded so as to avoid any damage which may be caused to the roots.

As can especially be seen in FIG. 4, the slide webs 15 are narrower than the basic member 14 and, with regard to the basic member surface facing outwards in the finished receptacle 1, they are set back by an amount corresponding to the distance of the guide grooves 10, 11, 12 from the respective neighbouring, parallel edge of the respective side wall 4, 5. The surface of the basic member 14 facing outwards will thus be flush with the side walls as well as with the back wall so that no edges remain to which decaying material can adhere. Each of the two slide webs 15 is, on the same side of the basic member 14, extended beyond said basic member by means of a section 18, which serves as a spacer. The length of the spacers 18 corresponds substantially to the width of the basic member 14 perpendicular to the plane of the drawing in FIG. 3. The end of each slide web which faces away from the spacer 18 has provided therein a recess 19 whose width and depth correspond to the dimensions of the spacer 18. The distance of the recesses 19 from the adjacent end of the slide web 15 corresponds to the distance of the slide web 15 from the basic member surface facing outwards. The width of the slide-in plates 13 in the longitudinal direction of the slide webs 15 and of the spacers 18 corresponds to the width of the side walls 4 and 5, respectively, projecting beyond the back wall 3.

The receptacle 1 is assembled to form a plant-cultivation board in the manner described hereinbelow. For forming the base 6, one of the slide-in plates 13 is—with the spacers 18 coming first—inserted into the lower horizontal guide grooves 12 of the two side walls 4 and 5 in such a way that the groove 16 faces upwards. When the spacers 18 abut on the back wall 3—a condition which can be seen in FIG. 6—a drainage opening 20 remains between the basic member 14 and said back wall. The front edge of the slide-in plate 13, which defines the base 6, is in alignment with the front edges of the side walls 4 and 5. Each of the recesses 19 is located in the area where the perpendicular guide grooves 10 and the lower, horizontal guide grooves 12 intersect. For assembling the front wall 2, the first front wall-defining slide-in plate 13 is then inserted into the perpendicular guide grooves 10 from above, again such that the spacers 18 come first. In the area in which the guide grooves 10 and 12 intersect each other, the spacers 18 of the first front wall-defining slide-in plate 13 penetrate the recesses 19 of the slide-in plate 13 defining the base 6. Due to the above-mentioned dimensions, the spacers 18 are flush with the surface of the base-defining slide-in plate 13 which faces outwards, whereas the lower edge of the basic member 14 rests on the base 6 (cf. FIG. 6). It follows that the slide-in plate defining the base 6 and the lowermost of the slide-in plates defining the front wall 2 are interlocked so that the base-defining slide-in plate is prevented from sliding out of the guide grooves 12 towards the front and the front wall-defining slide-in plate is prevented from sliding out of the guide grooves 10 towards the ground. Following this, an additional slide-in plate is inserted into the guide grooves 10 from above and pushed downwards until the spacers 18 rest on the upper edge of the first front wall-defining slide-in plate 13. An opening 21 will thus be formed between the slide-in plates, said opening 21 permitting access to the plant substrate in the interior of the receptacle 1. Subsequently, the number of slide-in plates 13 required for closing the front wall 2 will be inserted in the manner which has already been described hereinbefore. Each slide-in plate 13 or only selected ones is/are provided with a binding wire prior to insertion, the ends of said binding wire being passed through the openings 17 to the outside and being used for securing the plants in position. Moreover, planting can be carried out successively in such a way that each slide-in plate 13 has secured thereto the respective plant, the slide-in plate being then inserted. The roots are guided through the openings 21 into the interior of the receptacle 1 and plant substrate is filled in. Only then will the next following slide-in plate, with or without plants, be inserted and, if necessary, plant substrate will be filled in again. Before the uppermost slide-in plate of the plates defining the front wall 2 is inserted into the guide grooves 10, it will be necessary to fix the upper cover wall 7 unless said cover wall is dispensed with so as to increase humidification. Also for the upper cover wall 7 one of the slide-in plates 13 is used, said slide-in plate being inserted—with the groove 16 facing downwards and with the spacers coming first—into the upper, horizontal guide grooves 11 of the side walls 4 and 5. The back wall 3 has provided therein openings 22 in the area of contact of the spacers 18 (FIGS. 2 and 7), and these openings 22 will accommodate the spacers 18 completely so that the basic member 14 abuts on the back wall 3. It follows that the basic member edge facing away from the spacers is set back from the front edges of the side walls 4 and 5, respectively, by a distance corresponding to the width of the basic member 14 so that said edge abuts on the rear surface of the last front wall-defining slide-in plate and is secured against sliding out of the guide grooves 11 by means of this slide-in plate.

As a modification of the embodiment described hereinbefore and shown in the drawings, other releasable elements may be used instead of the slide-in plates, either for the front wall alone or for the front wall, the base and, if desired, the upper cover wall. Suitable elements would, for example, be plates which are articulated after the fashion of a hinge or which can be snapped in position or clamped in position. Furthermore, it is also possible to connect the base and, if desired, also the lower area of the front wall fixedly to the side walls and/or to the back wall. Instead of the slide webs, it is also possible to receive the edge portions of the slide-in plates in the guide grooves. The spacers need not necessarily be formed integrally with the slide-in plates, but they can also be inserted separately between the respective slide-in plates. Finally, the front wall surface facing outwards can be corrugated or provided with some other structure or it can be roughened so that reflections, which would spoil the outward appearance, are avoided and so that this surface, too, gives support to the roots. Perpendicular channels having a depth of from 0.5 to 1 mm at the most proved to be advantageous for this purpose.

I claim:

1. A plant-cultivation board for vertical epiphyte planting in a plant substrate, comprising:
   a receptacle (1) used for the plant substrate and comprising a back wall (3), a front wall (2) and opposed side walls (4,5); said back wall having a smooth inner surface facing said plant substrate, said front wall including a plurality of releasable elements (13), which are provided with fastening means (16, 16a, 17) for fastening the plants and at least one opening (21) which permits the plants to reach the plant substrate and which is formed by spacers (18) arranged between the elements (13); said opposed side walls (4,5) having vertical guide grooves (10), said releasable elements comprising slide-in plates (13) guided and held in said vertical guide groove of the opposed side walls.

2. A plant-cultivation board according to claim 1, wherein the back wall (3) of the receptacle (1) is made of transparent material.

3. A plant-cultivation board according to claim 1 wherein the surface of the releasable elements (13) which faces outwards is corrugated, roughened or provided with small channels.

4. A plant-cultivation board according to claim 1 further comprising horizontal guide grooves (12) formed at the lower end of the opposed side walls (4,5) and a base (6) comprising a slide-in plate (13) guided and held in horizontal guide grooves at the lower end of the opposed side walls.

5. A plant-cultivation board according to claim 4, further comprising horizontal guide grooves (12) formed at the upper end of the opposed side walls (4,5) and an upper cover wall (7) comprising a slide-in plate (13) guided and held in horizontal guide grooves at the upper end of the opposed side walls.

6. A plant-cultivation board according to claim 5, wherein the slide-in plates (13) forming the front wall (2), the base (6) and the upper cover wall (7) are provided with identical structural designs.

7. A plant-cultivation board according to claim 4, wherein the base (6) and the front wall (2) are interlocked by a locking means (18,19), said locking means comprising spacers (18) engaging recesses (19) in the slide-in plate (13) defining the base (6) and said spacers (18) being part of the lower slide-in plate defining the front wall (2) and contacting the base (6).

8. A plant-cultivation board according to claim 7, wherein the slide-in plate (13) defining the upper cover wall (7) is locked in position abutting on the upper slide-in plate (13) of the front wall (2).

9. A plant-cultivation board according to claim 8, comprising spacers (18) guided in the guide grooves (10,11,12).

10. A plant-cultivation board according to claim 9, wherein the fastening means includes a groove, which is arranged on the back of the releasable element (13) facing the plant substrate and which is used for receiving therein binding material (16a) for the plants, said groove (16) being connected to the front of the element (13) through openings (17) through which the binding material (16a) can be passed.

11. A plant cultivation board for vertical epiphyte planting in a plant substrate comprising:
    a receptacle for receiving said plant substrate;

said receptacle including a back wall having a smooth inner surface facing said plant substrate, a front wall, opposed side walls having vertical and horizontal guide grooves, and a base;

said front wall being formed of a plurality of releasable slide-in plates guided and held in said vertical guide grooves, an opening being provided between at least two of said releasable slide-in plates forming said front wall permitting the plants to reach the plant substrate, said opening being formed by spacers arranged between two adjacent slide-in plates, said slide-in plates being provided with fastening means for fastening said plants;

said base of said receptacle being formed by a slide-in plate which is guided and held in said horizontal guide grooves formed at the lower end of said opposed side walls of the receptacle, said slide-in plate of said base and the lower one of said slide-in plates of said front wall being interlocked by a locking means comprising spacers arranged at one of said interlocked slide-in plates and engaging recesses arranged at the other of said interlocked slide-in plates.

12. A plant-cultivation board according to claim 14, wherein the back wall of the receptacle is made of transparent material.

13. A plant-cultivation board according to claim 11, wherein the surface of the releasable elements which faces outwards is corrugated, roughened or provided with small channels.

14. A plant-cultivation board for vertical epiphyte planting in a plant substrate comprising:
a receptacle for receiving said plant substrate;
said receptacle including a back wall having a smooth inner surface facing said plant substrate, a front wall, opposed side walls having vertical and horizontal guide grooves, and an upper cover wall;
said front wall being formed of a plurality of releasable slide-in plates guided and held in said vertical guide grooves, said slide-in plates being provided with fastening means for fastening said plants, an opening being provided between at least two of said releasable slide-in plates permitting the plants to reach the plant substrate, said opening being formed by spacers arranged between two adjacent slide-in plates; and
said upper cover wall being formed by a slide-in plate which is guided and held in said horizontal guide grooves formed at the upper end of said opposed side walls of the receptacle, said slide-in plate defining the upper cover wall being locked in place by abutting the upper slide-in plate of the front wall.

15. A plant cultivation board for vertical epiphyte planting in a plant substrate comprising:
a receptacle for receiving said plant substrate;
said receptacle including a back wall having a smooth inner surface facing said plant substrate, a front wall and opposed side walls;
said front wall being formed of a plurality of releasable slide-in plates guided and held in vertical guide grooves whcih are provided in said opposed side walls; and
said slide-in plates being provided with fastening means for fastening said plants, an opening being provided between at least two of said releasable slide-in plates permitting the plants to reach the plant substrate, said opening being formed by spacers arranged between two adjacent slide-in plates, said spacers being guided in said guide grooves.

16. A plant cultivation board according to claim 15, wherein the slide-in plates forming the front wall, the base and the upper cover wall are provided with identical structural designs.

17. A plant-cultivation board according to claim 15, wherein the back wall of the receptacle is made of transparent material.

18. A plant-cultivation board according to claim 15, wherein the surface of the releasable elements which faces outwards is corrugated, roughened or provided with small channels.

19. A plant-cultivation board for vertical epiphyte planting in a plant substrate comprising:
a receptacle for receiving said plant substrate;
said receptacle including a back wall having a smooth inner surface facing said plant substrate, and a front wall;
said front wall being formed of a plurality of releasable wall elements, an opening being provided between at least two of said releasable wall elements permitting the plants to reach the plant substrate, said opening being formed by spacers arranged between two adjacent releasable wall elements, said wall elements being provided with fastening means for fastening said plants, said fastening means including a groove on the back of the releasable wall element facing the plant substrate for receiving therein binding material for the plants, said groove being connected to the front of the wall element via openings through which the binding material can be passed.

20. A plant-cultivation board according to claim 19, wherein the slide-in plates forming the front wall are provided with identical structural designs.

21. A plant-cultivation board according to claim 19, wherein the back wall of the receptacle is made of transparent material.

22. A plant-cultivation board according to claim 19, wherein the surface of the releasable elements which faces outwards is corrugated, roughened or provided with small channels.

* * * * *